United States Patent [19]
Rockow et al.

[11] Patent Number: 6,153,947
[45] Date of Patent: Nov. 28, 2000

[54] DUAL FEED HOT SWAP BATTERY PLANT CONTROLLER FOR POWER SUPPLIES

[75] Inventors: Bruce C. Rockow, Plainfield; Thuc Khanh Vu, Naperville, both of Ill.

[73] Assignee: Lucent Technologies Inc., Murray Hill, N.J.

[21] Appl. No.: 09/348,616

[22] Filed: Jul. 6, 1999

[51] Int. Cl.[7] ............................................. H02J 9/06
[52] U.S. Cl. ................................................. 307/64
[58] Field of Search ............................. 307/43, 64, 65, 307/66, 112, 115, 116, 87, 125, 126

[56] References Cited

U.S. PATENT DOCUMENTS

| | | | |
|---|---|---|---|
| 4,763,013 | 8/1988 | Gvoth, Jr. et al. | 307/66 |
| 5,241,217 | 8/1993 | Severinsky | 307/34 |
| 5,579,197 | 11/1996 | Mengelt et al. | 361/93 |
| 5,610,496 | 3/1997 | Hofbauer et al. | 320/13 |
| 5,784,626 | 7/1998 | Odaohara | 395/750 |
| 5,867,007 | 2/1999 | Kim | 320/118 |
| 5,917,250 | 6/1999 | Kakalec et al. | 307/18 |
| 5,939,799 | 8/1999 | Weinstein | 307/64 |

*Primary Examiner*—Josie Ballato
*Assistant Examiner*—Robert L. DeBeradinis
*Attorney, Agent, or Firm*—Duft, Graziano & Forest, P.C.

[57] ABSTRACT

The dual feed hot swap battery plant controller for power supplies provides true isolation between buses, both power and return, and enables the use of a single power converter, which may be powered from two totally isolated independent battery plant feeds. The dual feed hot swap battery plant controller is connected to the power and return buses of both a primary and a secondary battery plant. The dual feed hot swap battery plant controller uses a pair of hot swap devices to monitor the power and return buses of both the primary and the secondary battery plants to determine the state of each of these battery plants. The pair of hot swap devices are interconnected to control the operation of a power switching relay device which switches and provides true isolation between buses, both power and return in response to the present state of the battery plants. The switched power and return buses are used to power a single power converter, thereby sharing the power converter between two battery plants. Additional control circuitry is provided to indicate the occurrence of a power failure as well as provide the ability to test both buses under software control with high level of confidence of catching latent faults.

4 Claims, 1 Drawing Sheet

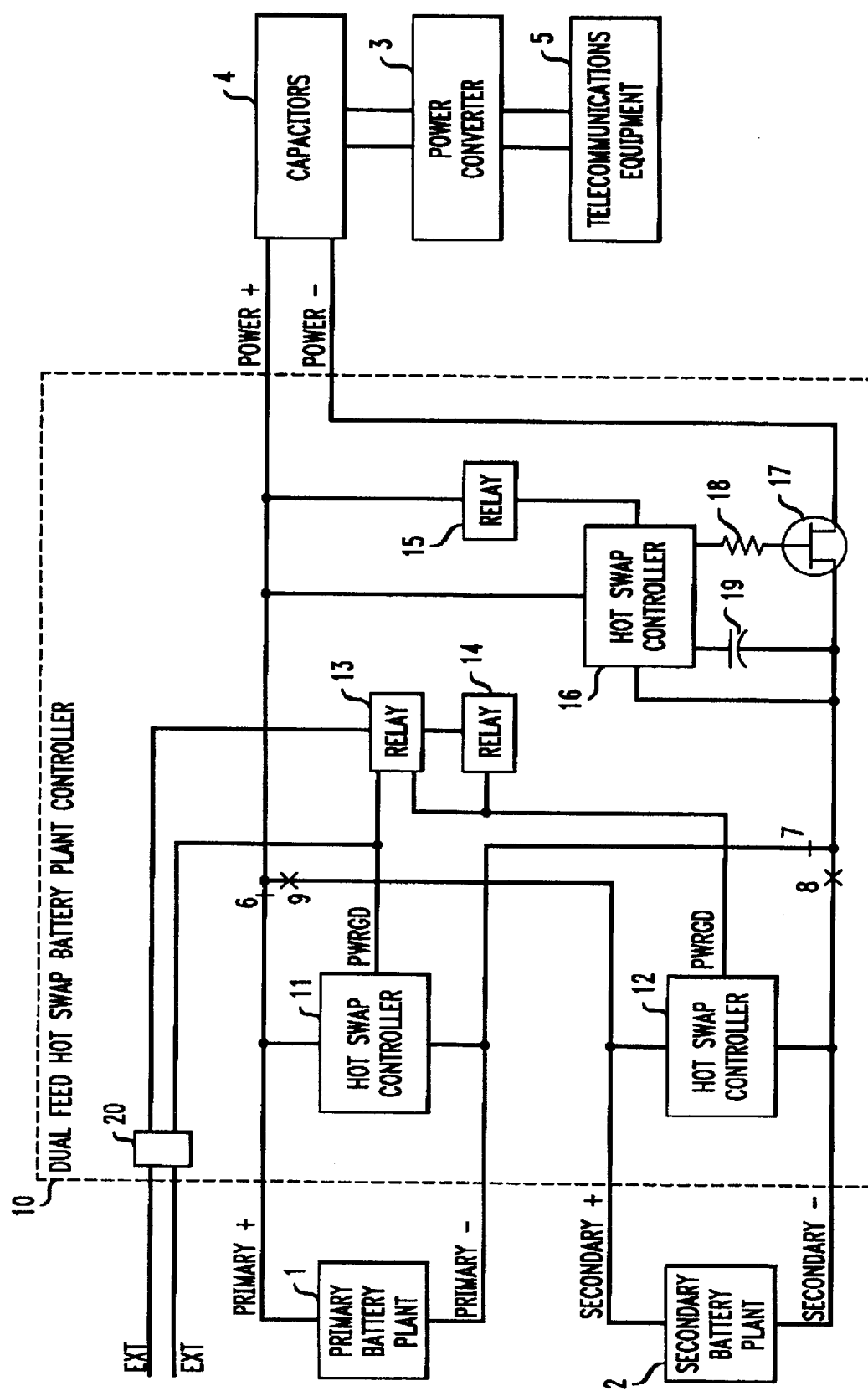

DUAL FEED HOT SWAP BATTERY PLANT CONTROLLER FOR POWER SUPPLIES

FIELD OF THE INVENTION

This invention relates to dual isolated battery plants in telecommunications systems and a dual feed hot swap battery plant controller that provides true isolation between buses, both power and return, and enables the use of a single power converter, which may be powered from two totally isolated independent feeds.

PROBLEM

It is a problem in the field of dual isolated battery plants in telecommunications systems to maintain power bus redundancy with true isolation between power busses. The battery plants are used to provide a backup source of power to the telecommunications circuits in the event of a failure of the commercial AC power. The use of dual battery plants is for redundancy purposes and also enables the primary battery plant to provide power for a predetermined period of time, with the secondary battery plant being available in a hot standby mode to extend the battery backup time when the power capacity of the primary battery plant is exhausted.

It is desirable to isolate the two battery plants to thereby ensure true redundancy and avoid the instance of a single failure disabling the entirety of the battery plant. In many battery plant systems, diode OR-ing is used, but this is not an acceptable solution in that latent faults can occur in the battery plant without a viable method of detection or the ability to isolate the fault to a particular battery plant. The present state of the art is therefore the use of dual power converters, each one of which operates from a corresponding one of two independent and totally isolated battery plant buses. Thus, the primary and secondary battery plants are each equipped with their own dedicated power converter while current sharing their secondaries through some sort of switching element. The drawbacks of this solution are that the two on board power converters use up valuable circuit board space, which space is commonly at a premium. In addition, power converters do not share loads equally, thus the load balancing of primary power buses is difficult to control. Finally, the resultant product cost is increased due to the use of the two power converters.

Thus, in the field of dual isolated battery plants in telecommunications systems there is presently no inexpensive solution to the need for a power controller that provides true isolation between buses, both power and return, and enables the use of a single power converter, which may be powered from two totally isolated independent feeds.

SOLUTION

The above described problems are solved and a technical advance achieved by the present dual feed hot swap battery plant controller for power supplies which provides true isolation between buses, both power and return, and enables the use of a single power converter, which may be powered from two totally isolated independent battery plant feeds. The dual feed hot swap battery plant controller is connected to the power and return buses of both a primary and a secondary battery plant. The dual feed hot swap battery plant controller uses a pair of hot swap devices to monitor the power and return buses of both the primary and the secondary battery plants to determine the state of each of these battery plants. The pair of hot swap devices are interconnected to control the operation of a power switching relay device which switches and provides true isolation between buses, both power and return in response to the present state of the battery plants. The switched power and return buses are used to power a single power converter, thereby sharing the power converter between two battery plants. Additional control circuitry is provided to indicate the occurrence of a power failure as well as provide the ability to test both buses under software control with high level of confidence of catching latent faults.

Thus, the unique features of the dual feed hot swap battery plant controller are:
1. No diode OR-ing.
2. True isolation between primary and secondary battery plant buses, both power and return.
3. Full control over primary/secondary current sharing.
4. The ability to test both buses under software control with high level of confidence of catching latent faults.
5. A single power converter may be powered from two totally isolated and independent battery plant feeds.
6. Lower system operating expense due to lower battery plant power consumption, including battery plant capacity.

BRIEF DESCRIPTION OF THE DRAWING

FIG. 1 illustrates in block diagram form the overall architecture of the present dual feed hot swap battery plant controller and an environment in which it operates.

DETAILED DESCRIPTION

Battery plants are used to provide a backup source of power to the telecommunications circuits in the event of a failure of the commercial AC power. The use of dual battery plants is for redundancy purposes and also enables the primary battery plant to provide power for a predetermined period of time, with the secondary battery plant being available in a hot standby mode to extend the battery backup time when the power capacity of the primary battery plant is exhausted.

FIG. 1 illustrates in block diagram form the overall architecture of the present dual feed hot swap battery plant controller 10 and an environment in which it operates. In particular, a primary battery plant 1 and a secondary battery plant 2 are connected to the input leads of the dual feed hot swap battery plant controller 10 via leads PRIMARY+, PRIMARY– and SECONDARY+, SECONDARY–, respectively. The output leads POWER+, POWER– of the dual feed hot swap battery plant controller 10 are connected to a single power converter 3 and a set of storage capacitors 4 which together are used to provide DC power to a set of telecommunications equipment 5. This system provides continuity of power to the telecommunications equipment 5 in the event of a failure of the commercial AC power. The DC power output of the battery plant is used by the power converter 3 to generate DC power. The battery plants 1, 2 are maintained in a charged state by the commercial AC power and, when the commercial AC power fails, the storage capacitors 4 are used to provide transient protection as the battery plants 1, 2 are switched on line and in the event that a switch occurs between the primary battery plant 1 and the secondary battery plant 2 via the dual feed hot swap battery plant controller 10.

In the event of a power failure in the primary battery plant 1, lead PWRGD of hot swap controller 11 goes high, releasing relay 13, which activates relay 14 which activates power switching relay 15. The result is a switch from the primary battery plant power feed PRIMARY+, PRIMARY− to the secondary battery plant power feed SECONDARY+, SECONDARY− within approximately 3 milliseconds via the break-before-make contacts of power switching relay 15. This switching mode disconnects the primary battery plant 1 from the input of the power converter 3 prior to the connection of the secondary battery plant 2 to the input of the power converter 3. The power converter 3 and surrounding circuitry must have a sufficient amount of primary storage capacitance 4 in order to ride through the 3 millisecond switching transient. The necessary amount of capacitance can be calculated on a circuit by circuit basis since power requirements vary from design to design. The dual feed battery plant controller circuit 10 also offers the ability to test the functionality of both buses under software control without the risk of duplex failure by applying control signals to the logic devices 13,14 to force the switching of the power feeds under software control.

Dual Feed Hot Swap Battery Plant Controller Circuit Details

The dual feed hot swap battery plant controller 10 uses a pair of hot swap controllers 11, 12 to monitor the power and return buses of both the primary battery plant 1 and the secondary battery plant 2, respectively, to determine the state of each of these battery plants. The pair of hot swap controllers 11, 12 do not control the current supplied on the power and return leads PRIMARY+, PRIMARY− and SECONDARY+, SECONDARY−, respectively, but are used simply to monitor the voltage that appears on the power and return leads of the respective battery plants 1, 2. The presence of a voltage of predetermined magnitude across the power and return leads that are monitored results in a logic signal output from the hot swap controllers 11, 12 on the PWRGD lead. The signals on the PWRGD leads of the pair of hot swap controllers 11, 12 are interconnected via corresponding relays 13, 14 to control the operation of a power switching relay 15, which switches and provides true isolation between buses, both power and return in response to the present state of the battery plants 1, 2. In particular, power switching relay 15 is normally in the released state, thereby interconnecting the power and return leads PRIMARY+, PRIMARY− of the primary battery plant 1 to the input of the power converter 3. The relays 13, 14 also include logic outputs STATE+, STATE− which indicate the condition of the associated battery plant to control circuitry.

The hot swap controllers 11, 12 comprise a commercially available product, such as the negative voltage hot swap controller LT1640L device manufactured by Linear Technology Corporation. The negative voltage hot swap controller comprises a device which allows a circuit board to be safely inserted and removed from a backplane connector that is powered up. The negative voltage hot swap controller limits the inrush current to a programmable value by controlling the gate voltage of an external N-channel pass transistor. The pass transistor is turned off if the input voltage sensed by the negative voltage hot swap controller is less than the programmed under voltage threshold or greater than the programmed over voltage threshold. A programmable electronic circuit breaker is also included to protect the system against short circuit conditions. The voltage programmed into the hot swap controller device can be any selected value within the range of voltages that the device is design to handle. The device noted above has a counterpart device which can be used in the instance where the voltage to be controlled is a positive voltage. Furthermore, the hot swap aspect of this system is not a condition precedent, in that the system works for elements that do not need to be hot swapped.

Hot swap controller 11 has the task of monitoring the battery feed output leads that are labeled PRIMARY+ and PRIMARY−, while hot swap controller 12 monitors the battery feed output leads SECONDARY+ and SECONDARY−. When the primary battery feed is at its specified output voltage, hot swap controller 11 detects this level when the circuit board is first plugged in and presents a low logic signal at lead PWRGD. As long as hot swap controller 11 detects a voltage between the predetermined limits, such as −37 to −75 volts, then lead PWRGD remains in a low state, which results in relay 13 being activated while relay 14 is held in a released condition. Since relay 14 is inactive, this also holds power switching relay 15 in the off state, which results in power switching relay contacts 6,9 and 7,8 being closed. The closed contacts enable an input voltage to be applied to hot swap controller 16, which monitors the voltage on leads POWER+, POWER− and determines whether it is within the predetermined limit voltages, such as −32 to −78 volts. The range of voltages monitored by hot swap controller 16 is typically greater than that monitored by hot swap controllers 11, 12 to buffer any input transients associated with switching between the PRIMARY and SECONDARY sets of leads. If the input voltage monitored by hot swap controller 16 is within the predetermined limits, then lead GATE presents a high output signal, which turns on power surge control transistor 17 within a predetermined amount of time. The turn on interval for power surge control transistor 17 is determined by the selection of the values for resistor 18 and capacitor 19. The delay in power application to leads POWER+, POWER− ensures that the contacts of the printed circuit board are not damaged by a current surge during board insertion.

If a failure in the primary battery plant 1 occurs, it is detected by hot swap controller 11, which forces its output signal on lead PWRGD to a high state. If the input applied to hot swap controller 12 also meets its predetermined limits, then relay 14 is activated. The activation of relay 14 causes the power switching relay 15 to be activated, which interconnects the secondary battery plant 2 to feed the output leads POWER+, POWER− through relay contacts 6,9 and 7,8. When the primary battery plant 1 is restored to operating condition, the dual feed hot swap battery plant controller switches back to its original state.

What is claimed:

1. A dual feed battery plant controller connected to both a primary battery plant having a power bus and a return bus as well as a secondary battery plant having a power bus and a return bus, for selectively interconnecting a one of said primary battery plant and said secondary battery plant to a power converter in a manner to provide switching of both said power bus and return bus of one of the primary and the secondary battery plants to the power converter, comprising:

first power monitoring means for monitoring the power output of said primary battery plant comprising a first hot swap controller means for generating a first signal when said monitored power output of said primary battery plant is between first and second predetermined limits, and a second signal when said monitored power output of said primary battery plant fails to be between first and second predetermined limits;

second power monitoring means for monitoring the power output of said secondary battery plant comprising a second hot swap controller means for generating a first signal when said monitored power output of said primary battery plant is between first and second predetermined limits, and a second signal when said monitored power output of said primary battery plant fails to be between first and second predetermined limits;

means, connected to said first and said second power monitoring means, and responsive to output signals received therefrom indicative of a determined power output of said primary and said secondary battery plants, respectively, for disconnecting said primary battery plant from said power converter and for connecting said secondary battery plant to said power converter; and third hot swap controller means, connected between said disconnecting means and said power converter, for monitoring a power output applied to said power converter by said disconnecting means.

2. The dual feed battery plant controller of claim 1 further comprising:

power surge controller means for regulating said power output applied to said power converter by said disconnecting means.

3. A method of operating a dual feed battery plant controller connected to both a primary battery plant having a power bus and a return bus as well as a secondary battery plant having a power bus and a return bus, for selectively interconnecting a one of said primary battery plant and said secondary battery plant to a power converter in a manner to provide switching of both said power bus and return bus of one of the primary and the secondary battery plants to the power converter, comprising the steps of:

operating a first power monitoring circuit to monitor the power output of said primary battery plant comprising generating a first signal when said monitored power output of said primary battery plant is between first and second predetermined limits, and a second signal when said monitored power output of said primary battery plant fails to be between first and second predetermined limits;

operating a second power monitoring circuit to monitor the power output of said secondary battery plant comprising generating a first signal when said monitored power output of said primary battery plant is between first and second predetermined limits, and a second signal when said monitored power output of said primary battery plant fails to be between first and second predetermined limits;

disconnecting, in response to output signals received from said first power monitoring circuit and said second power monitoring circuit indicative of a determined power output of said primary and said secondary battery plants, respectively, said primary battery plant from said power converter and for connecting said secondary battery plant to said power converter; and monitoring a power output applied to said power converter.

4. The method of operating a dual feed battery plant controller of claim 3 further comprising the step of:

regulating said power output applied to said power converter.

* * * * *